US007526727B2

(12) United States Patent
Wegeng et al.

(10) Patent No.: US 7,526,727 B2
(45) Date of Patent: Apr. 28, 2009

(54) MARKING MACHINE USER INTERFACE SUPPLEMENTATION VIA ADDED, ATTACHED PORTABLE ELECTRONIC DEVICE

(75) Inventors: Donald L. Wegeng, Fairport, NY (US); Bruce E. Talbert, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 647 days.

(21) Appl. No.: 10/272,871

(22) Filed: Oct. 16, 2002

(65) Prior Publication Data

US 2004/0041834 A1    Mar. 4, 2004

Related U.S. Application Data

(60) Provisional application No. 60/407,230, filed on Aug. 29, 2002.

(51) Int. Cl.
G06F 3/02      (2006.01)
H01H 13/70   (2006.01)
H03K 17/94   (2006.01)

(52) U.S. Cl. .................. 715/740; 715/780; 715/804; 715/864

(58) Field of Classification Search ............ 715/780, 715/864, 740, 804
See application file for complete search history.

(56) References Cited

U.S. PATENT DOCUMENTS 5,515,171 A * 5/1996 Nara et al. ................. 358/296

| 6,246,489 | B1 * | 6/2001 | Park ........................... 358/1.15 |
| 6,320,943 | B1 * | 11/2001 | Borland .................. 379/112.01 |
| 6,453,127 | B2 * | 9/2002 | Wood et al. ..................... 399/8 |
| 6,489,954 | B1 * | 12/2002 | Powlette ...................... 715/733 |
| 6,727,930 | B2 * | 4/2004 | Currans et al. .............. 715/864 |
| 6,744,874 | B2 * | 6/2004 | Wu ........................ 379/220.01 |
| 6,771,302 | B1 * | 8/2004 | Nimri et al. .............. 348/14.08 |
| 7,010,294 | B1 * | 3/2006 | Pyotsia et al. ............... 455/420 |
| 7,178,097 | B1 * | 2/2007 | Talluri ..................... 715/501.1 |
| 2002/0076004 | A1 * | 6/2002 | Brockenbrough et al. .. 379/67.1 |
| 2003/0135647 | A1 * | 7/2003 | Himmel et al. ............. 709/245 |

FOREIGN PATENT DOCUMENTS

JP          11205516 A  *   7/1999

OTHER PUBLICATIONS www.webopedia.com Definitiion of Applet. Last modified Sep. 1, 1996.*

* cited by examiner

*Primary Examiner*—Sara M Hanne
(74) *Attorney, Agent, or Firm*—Fay Sharpe LLP (57) ABSTRACT

A user interface extension allows data entry into a marking machine user interface field from an electronic device, such as a PDA, attached to the marking machine via compatible communications ports. The marking machine includes a UI field into which data must be entered, the user lets the machine know that data will come from the electronic device, and the machine begins monitoring its communications ports for the data. The user enters or selects data to be transmitted from the electronic device, then indicates that the data is ready to be sent, at which point the electronic device transmits the data to the machine via a communications port of the electronic device.

22 Claims, 7 Drawing Sheets

MARKING MACHINE USER INTERFACE SUPPLEMENTATION VIA ADDED, ATTACHED PORTABLE ELECTRONIC DEVICE

CROSS REFERENCE TO RELATED APPLICATIONS

This application is based on a Provisional Patent Application Serial No. 60/407,230, filed Aug. 29, 2002.

FIELD OF THE INVENTION

Embodiments relate to marking machine user interfaces (UIs). More particularly, embodiments relate to allowing interaction and supplementation of a marking machine user interface through an attached portable electronic device, such as a personal digital assistant (PDA), cellular/wireless telephone, hybrid PDA/telephone, or portable computers, among other devices.

BACKGROUND AND SUMMARY

The local UIs on most marking machines, such as multi-function devices and electrophotographic and xerographic printers and copiers, are tradeoffs between functionality and size/cost. One outcome of this tradeoff is that the local UI design makes it easy for the user to enter numeric data, but more difficult to enter text data. Hard buttons are typically used for entering numeric data only, with alternate entry interfaces being used for text data. Typically, devices display a keyboard on a touch screen that allows users to select each letter to be entered. However, the touch area for each letter is small, making it easy to select the wrong letter. Thus, existing methods for entering text can be cumbersome to use.

This situation was not a problem when users did not need to enter much text information. However, as new functionality has been added to marking machines, the need for users to enter text data has increased. For example, the "scan to email" feature allows users to enter one or more email addresses as the destination for a scanning job. Using a touch screen as described above to enter an email address (such as "donald.wegeng@usa.xerox.com") is cumbersome. Since it is not practical to replace the local UI hardware on these products with something that is more text-friendly, an alternative means for entering text data would be useful.

The use of electronic devices, such as portable computers, hand-held Personal Digital Assistants (PDAs), cellular/wireless telephones, and PDA/phone hybrids, has become commonplace in many office environments. Laptop computers allow data entry in a number of ways, including keyboard, speech-to-text, and stylus-based entry. PDAs and hybrids usually provide a stylus-based mechanism for entering data, though small keyboards are also employed on some models. As an example, Palm OS based devices support text data input using a stylus-based pen stroke interface. Users of these devices quickly become proficient at entering text. Thus, electronic devices provide many ways to enter data that are much easier to use than those provided in typical marking machine UIs. Additionally, many electronic devices can store databases of contact information in the form of address books and the like. It would be advantageous for a user to select a contact entry and have the device automatically send contact information to the marking machine.

Further, most electronic device include at least one communications port that can be used to transfer data to a marking machine connected to a compatible communications port. Such communications ports can advantageously be wireless, such as Infrared Data Association (IrDA) compatible interfaces or BlueTooth interfaces, which can provide a wireless method for transferring data between the electronic device and the marking machine.

Embodiments provide for the attachment of an electronic device, such as, for example, a laptop computers, cellular/wireless telephone, and especially a hand-held Personal Digital Assistant (PDA) or PDA/telephone hybrid, as alternative interfaces for entering data, such as text data, into the local user interface of a device, such as a marking machine. Embodiments employ communications ports, such as infrared ports and other wireless communications ports, of electronic devices for transmitting data from the electronic device to the marking machine. Advantageously, the attached electronic device acts as an extension of the interface of the marking machine and can be added to existing machines, especially when the communications port is compatible with a communications port that already exists on the marking machine, such as a serial or parallel port. Data, such as text, can be entered into the electronic device using its normal method, such as with a stylus. Software on the electronic device accepts the data and transmits it to the marking machine via the communications port of the electronic device. A compatible communications port connected to the marking machine receives the data, and software on the marking machine inserts the data into an active entry field on the local UI.

The user uses the marking machine UI to select appropriate job options and brings up a data entry field. At this point, the UI presents an element, such as a graphically-rendered button, that instructs the marking machine to read the data from the connected communications port when activated. When this selection is made, the marking device monitors data coming in via the communications port and the user starts an application on the electronic device. Once the application is going, the user can select appropriate data from their address book or enter the appropriate data using the text entry mechanism on the electronic device. The application also provides a way for the user to indicate data entry completion, at which point the application transmits the data via the electronic device's communications port. The data is read by the marking machine and inserted into the recipient field on the local UI.

In embodiments, the application simply reads and transmits the data; it is not aware of the context in which the data was being used. This allows the application to be generic in nature, since all knowledge about the specific application is contained in the software running on the marking machine 10.

DETAILED DESCRIPTION

Figure 1:
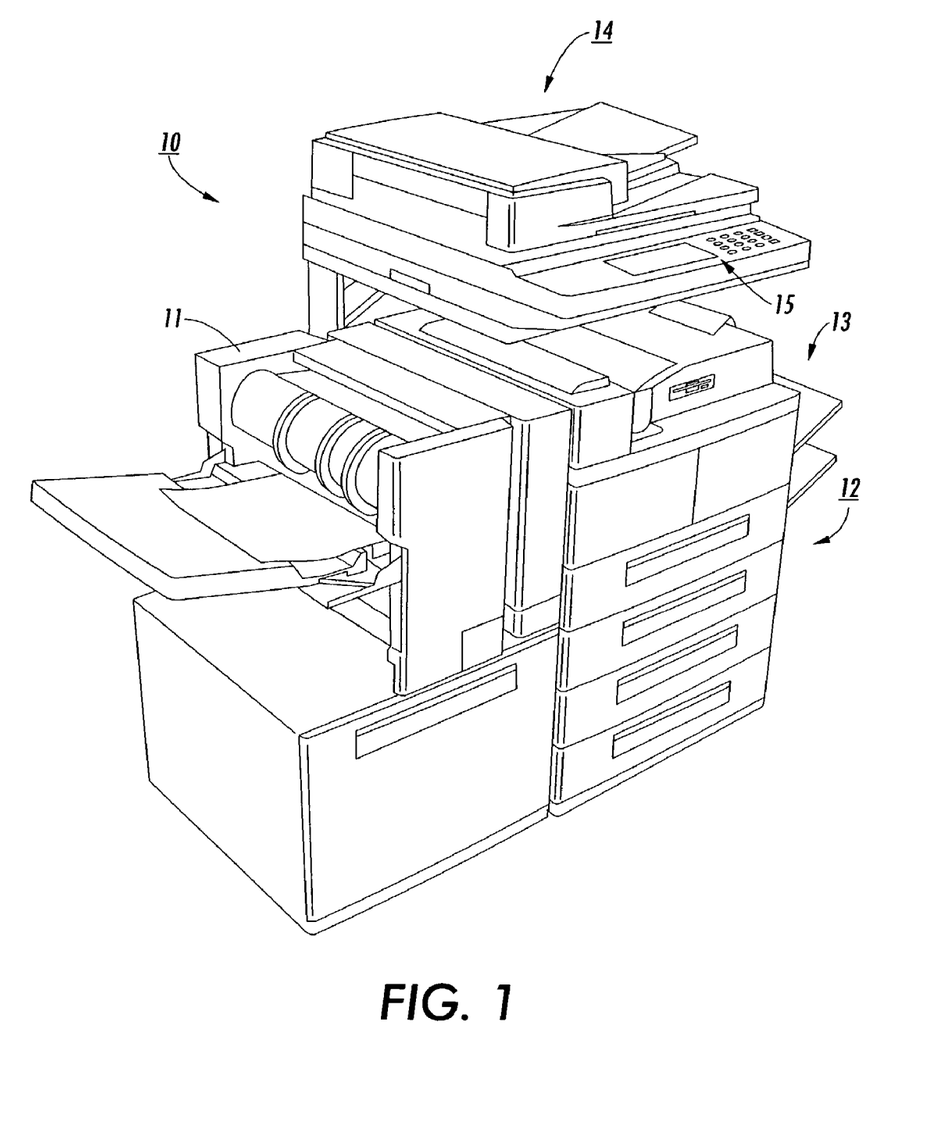
FIG. 1 is a schematic representation of a marking machine with which embodiments could be employed.

Embodiments will be described with reference to the accompanying FIGS. 1-9. As shown in FIG. 1, a marking machine 10 can include a media supply 11, a marking section 12, and an output section 13, as well as an input section 14 and a user interface section 15. The media supply 11 can include paper, transparency media, or any other media as appropriate for use by the marking section 12. The marking section 12 can be liquid ink jet based, phase change ink jet based, electrophotographic, xerographic, or based on other technologies as appropriate. The output section 13 can include a simple output tray, multiple bins, and/or media handlers and finishers as appropriate. The input section 14 can include a platen, a scanner, or any combination thereof as appropriate.

Figure 2:
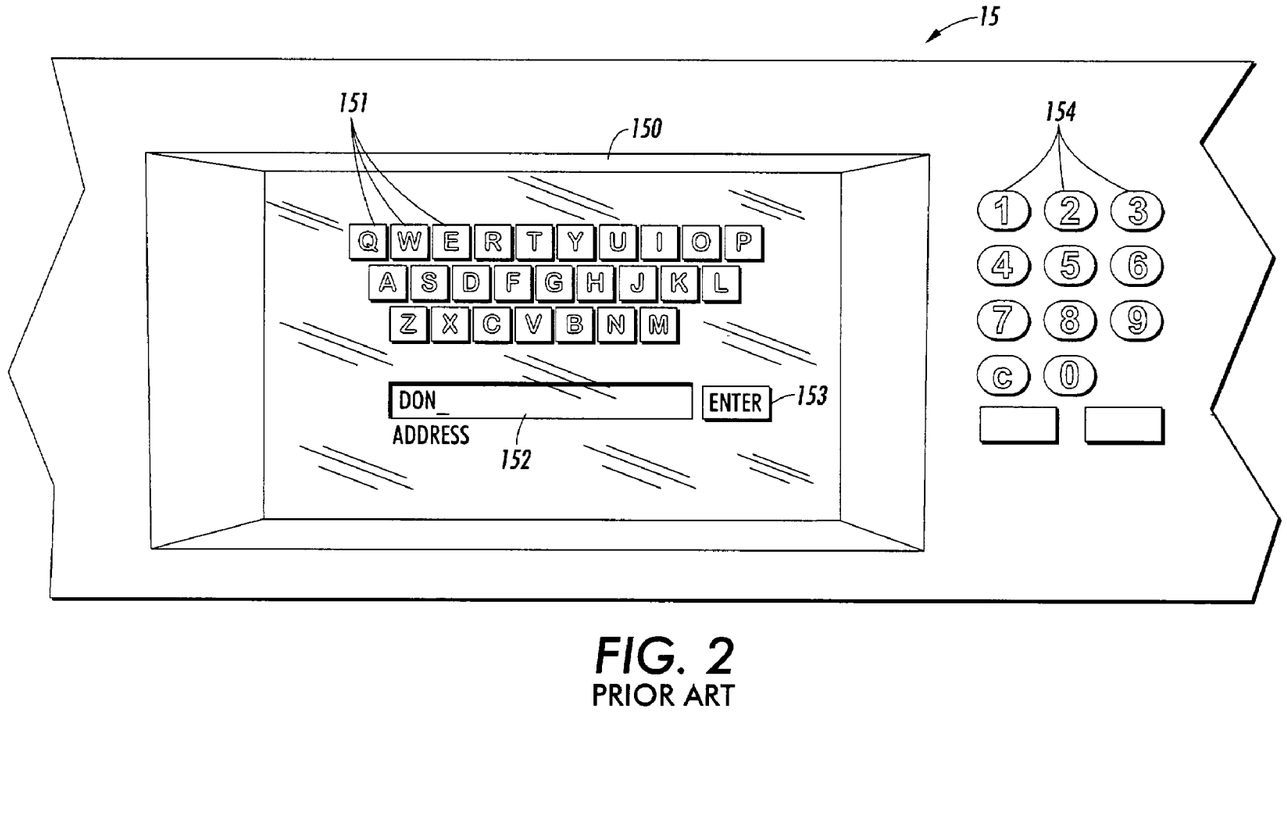
FIG. 2 is a schematic representation of a prior art user interface (UI) of a marking machine, such as that of FIG. 1.
Figure 3:
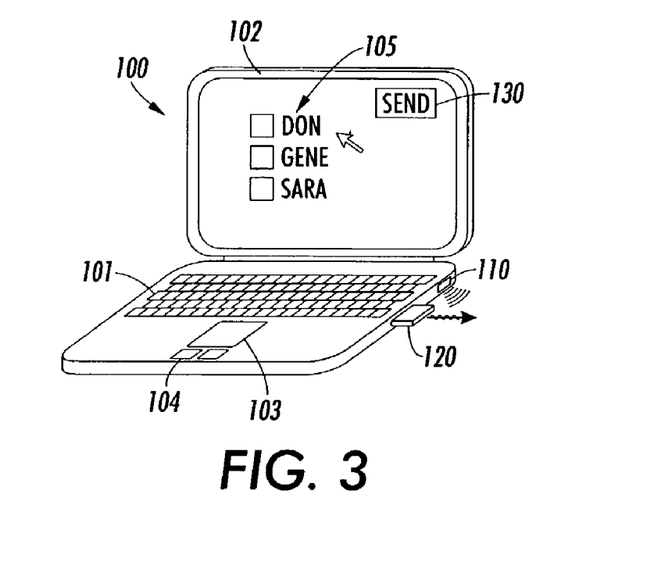
FIG. 3 is a schematic representation of a laptop/portable computer according to embodiments.

The UI section 15 will typically include a touch screen display 150, such as an LCD panel on which a graphically-represented keyboard including GUI elements 151, such as buttons, for the characters that can be entered. Additionally, data entry fields 152 will be presented on the display 150 in certain circumstances, and a submission element 153 will be included to indicate that the user is done entering data in the fields 152. Physical buttons 154 are typically provided for entry of numerical data and elemental control of the marking machine 10.

As seen in FIGS. 3-6, electronic devices 100, 100', 100", 100''' can comprise a portable computer 100, varieties of PDAs 100', 100", and cellular/wireless telephones 100'''. A portable computer 100, such as that shown schematically in FIG. 3, can include a keyboard 101, a display 102, a pointer control device 103, and a "mouse" button 104. The portable computer can include an address book or other database from which data 105 can be withdrawn, or the data 105 can be entered on demand with the keyboard. Such portable computers also include at least one communications port, such as IRDA port 110 and BlueTooth port 120.

Figure 4:
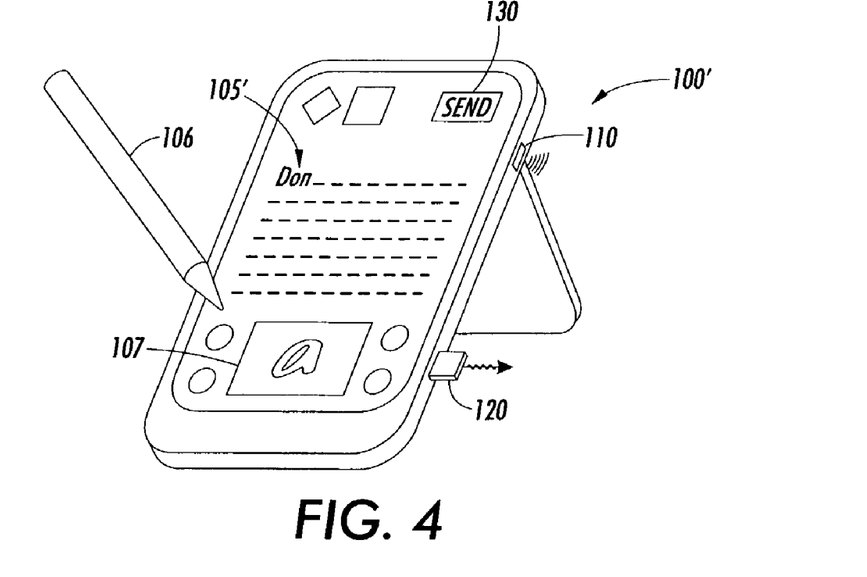
FIG. 4 is a schematic representation of a personal digital assistant (PDA) according to embodiments.

As seen particularly in FIG. 4, a PDA 100' can include a stylus 106 that can be used in conjunction with a specialized area 107 of its touch screen 102' for entry of data 105. The specialized area 107 is monitored for handwritten strokes that software on the PDA can translate into characters on the screen. Other PDAs, such as an alternative PDA 100" schematically illustrated in FIG. 5, can include a small keyboard 108 for data entry. Such alternative PDAs can still include a touch screen 102' and employ a stylus 106 for other functions, but will typically substitute the keyboard for a specialized area 107 for handwritten character recognition. In either case, PDAs 100', 100" can include address books or the like from which the data 105' can be withdrawn, or the data 105' can be entered on demand with the stylus 106 or keyboard 108.

Figure 6:
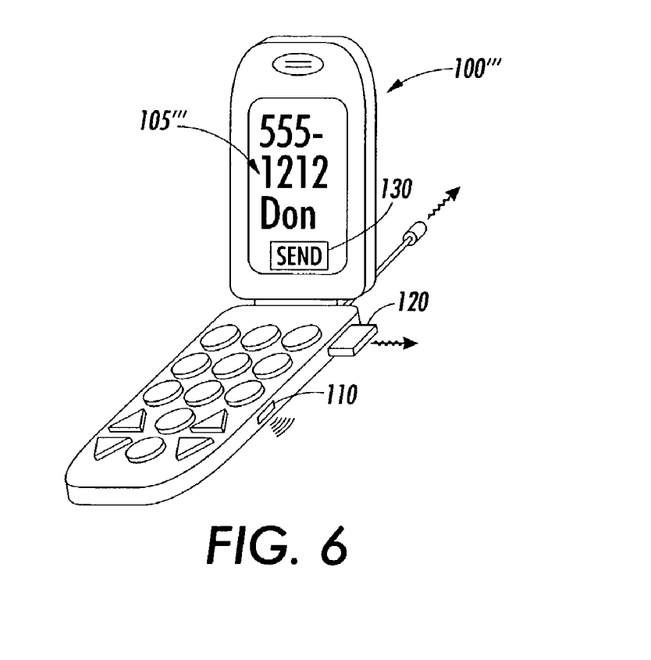
FIG. 6 is a schematic representation of a cellular/wireless telephone according to embodiments.

The electronic device can also take the form of a cellular/wireless telephone 100'''. Such a telephone 100''' can include a display 102", such as an LCD or OLED, a keypad 101', and an antenna 109. Telephones 100''' often include implementation of the Short Message Service (SMS) protocol to send short messages from one telephone to another. An excellent tutorial in SMS can be found at the International Engineering Consortium web site and is hereby incorporated by reference. The SMS protocol can be used in embodiments to allow data 105" to be sent from a telephone 100''' to the marking machine with the inclusion of SMS protocol in the marking machine. Additionally, a cellular/wireless telephone 100''' often includes a communications port to which an accessory device can be attached, which can include an infrared port 110 or a radio frequency port 120 through which data 105" can be transmitted. Other communications protocols can also be used, wireless and otherwise, with embodiments.

It is foreseeable that telephones and other electronic devices that do not currently will come with such ports built in and/or with expansion ports to which such communications ports can be attached, especially in light of the trend of late for telephones and PDAs to be merged into hybrid electronic devices. It is also foreseeable that other radio frequency, infrared, and visible light communications protocols will arise to which embodiments could be adapted and which thus fall within the scope of the invention.

Preferably, an electronic device 100, 100', 100", 100''' is attached to the marking machine 10, such as in the marking machine local UI area 15. This can be done to existing installations of marking machines to provide an inexpensive alternative data entry method. The electronic device 100, 100', 100", 100''' is used as an extension to marking machine 10 local UI 15 by sending data 105, 105', 105" from the electronic device to an entry field 152 of the UI 15. A user who needs to enter data, such as an email address, into the marking machine UI could enter the data into the electronic device and transmit ("beam") the data to the marking machine 10. The marking machine 10 can then insert the text into the appropriate field on the local UI.

Figure 7:
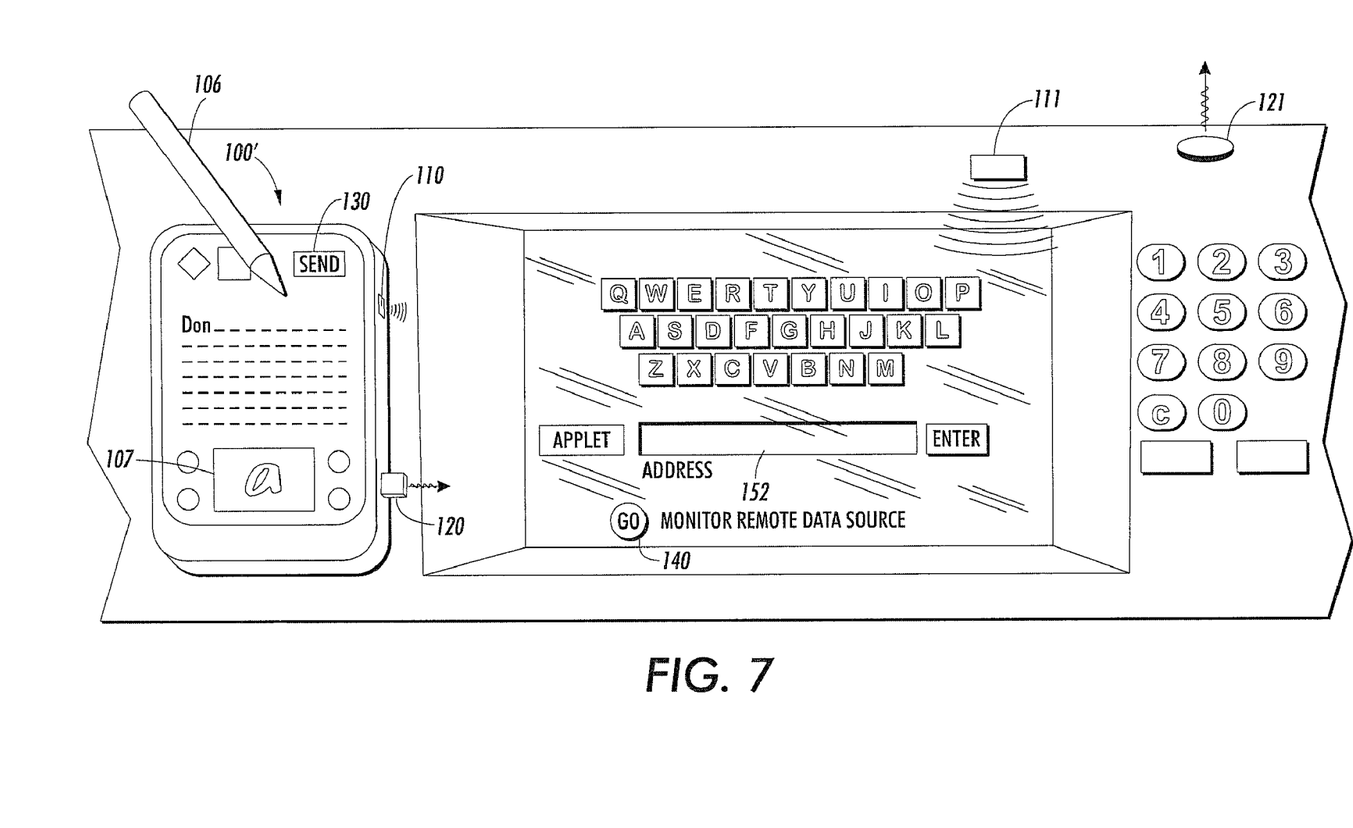
FIG. 7 is a schematic representation of a UI of a marking machine according to embodiments in which an electronic device, such as a stylus-based PDA with handwriting recognition, is attached.
Figure 8:
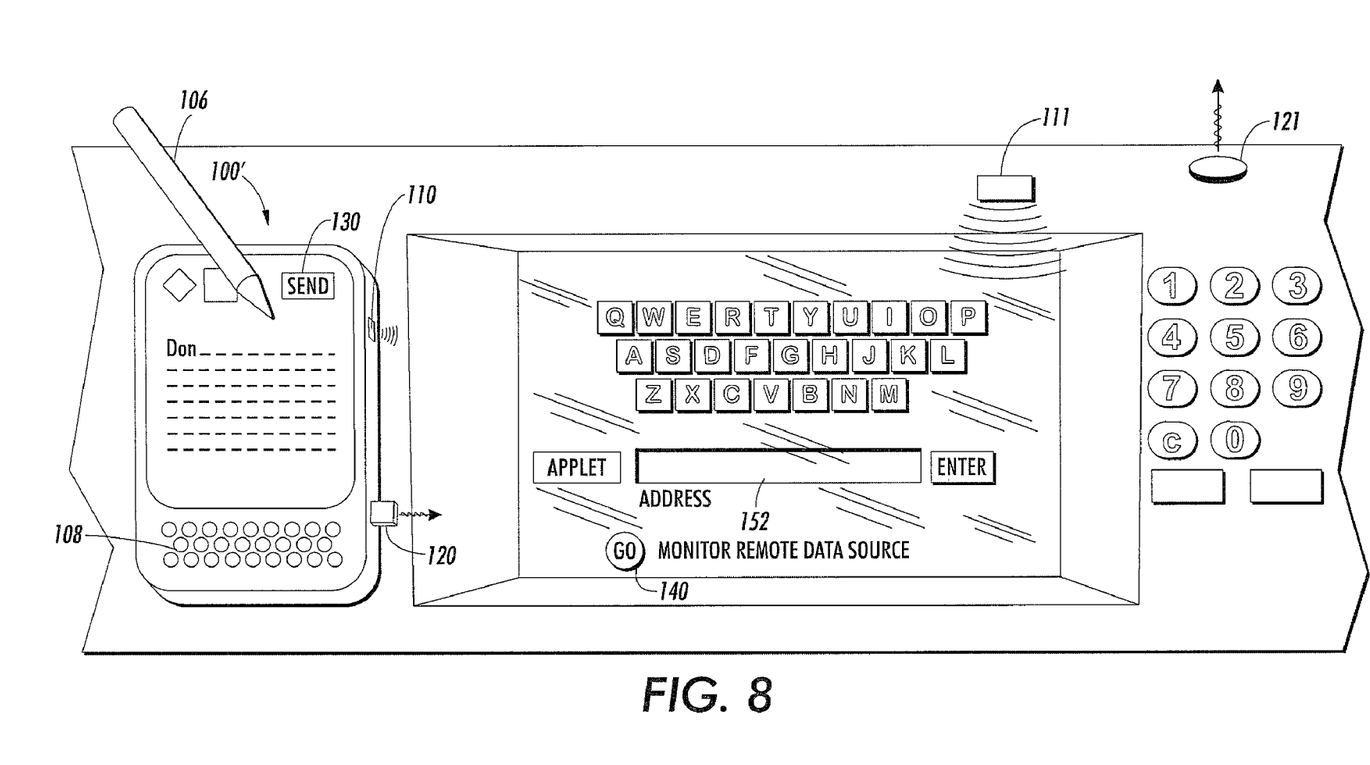
FIG. 8 is a schematic representation of a UI of a marking machine according to embodiments in which an electronic device, such as a stylus-based PDA with a mini-keyboard, is attached.

Thus, with particular reference to FIGS. 7 and 8, embodiments comprise initiating an action on a marking machine 10 via its UI 15, reaching a point at which data entry must take place, and notifying the marking machine 10 that the data will come from a source other than the UI 15 proper with, for example, a GUI element 140, such as a "Go" button. Activating the GUI element 140 starts an application on the marking machine 10 that monitors communications ports 111, 121 for the data 105, 105', 105" to be entered.

The user continues by entering data 105, 105', 105" on the electronic device and indicating that the data entry is complete, as with a GUI element 130 on the electronic device. Once the data is ready, the user indicates that the data entry is complete/ready, as with a GUI element 130 on the electronic device. An example of a transaction according to embodiments is the use of a PDA (the electronic device) to transmit a fax number (the data) to the GUI of a multifunction device (the marking machine), though many other scenarios fall within the scope of the invention, as will be apparent to one of skill in the art.

Figure 5:
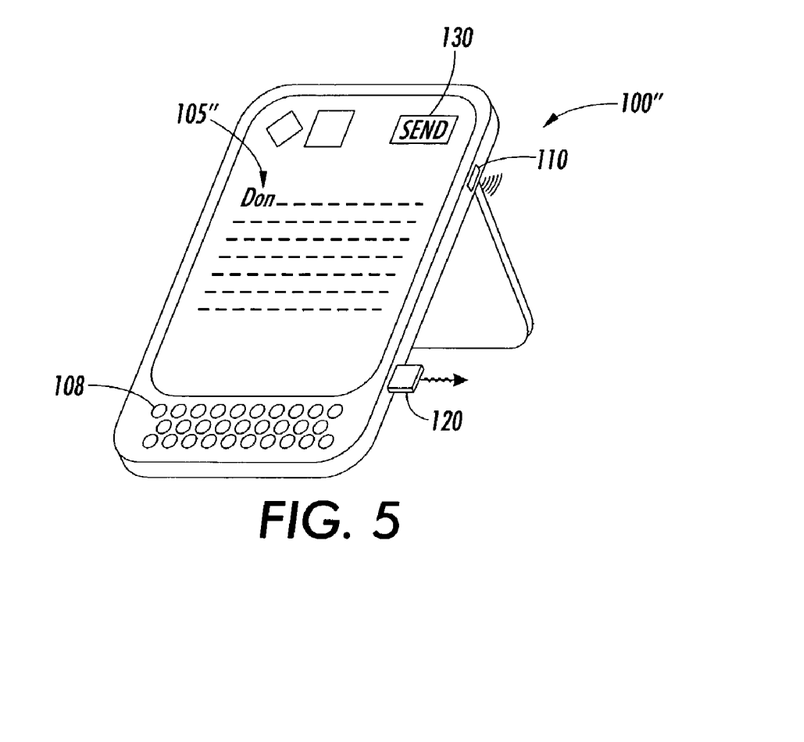
FIG. 5 is a schematic representation of a personal digital assistant (PDA) according to additional embodiments.

The data can be entered using a stylus 106 and a specialized handwriting recognition section 107 of the electronic device display 102', by a keyboard 101, 101', 108, by speech-to-text software, or by any other suitable methods or combination of entry methods. Alternatively, embodiments allow the user to continue by selecting an entry from a contact database, address book, or the like as the data 105, 105', 105". The selection can be accomplished using a stylus 106, keyboard 101, 101', 108, pointing device, or any other suitable input device. Since the electronic device is unlikely to include a user's personal address book in its local memory, embodiments can include a slot into which a user can insert a memory device containing the user's personal address book. Alternatively, a user can access a personal address book through a network to which the marking machine is attached.

Once the GUI element 130 on the electronic device has been triggered, an application on the electronic device transmits the data 105, 105', 105'' to the marking machine 10 via a communications port, such as an infrared communications port 110 or a radio frequency communications port 120. The application on the marking machine 10 detects the transmission and inserts the data into data entry field 152. The user can then confirm the entry of the data in the data entry field 152 and submit the data to the marking machine with, for example, a GUI element 153, such as an "ENTER" virtual button.

In embodiments, the electronic device 100' attached to the UI 15 of the marking machine 10, as seen schematically in FIGS. 7 and 8, can be a PDA. However, any suitable electronic device could be used. Additionally, in embodiments the electronic device 100' can be hard wired into the marking machine 10, and/or other communications ports of the electronic device 100' could be used to send data 105' to the marking machine 10 via compatible communications ports of the marking machine 10. For example, the electronic device 100' could communicate with the marking machine 10 via a serial or parallel port of the marking machine.

Figure 9:
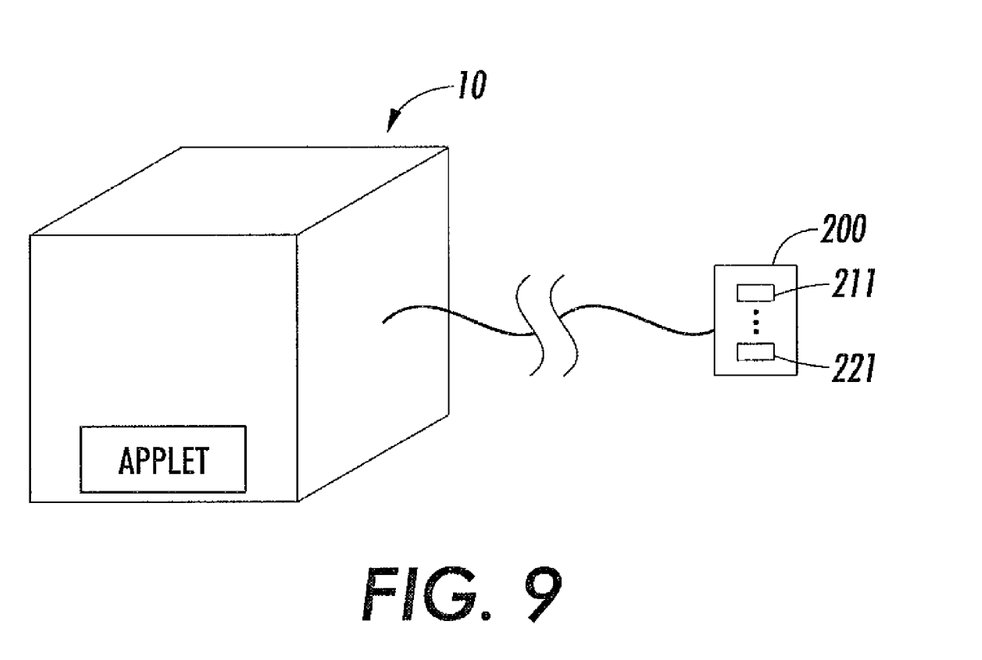
FIG. 9 is a schematic representation of a communications port connected to a marking machine according to embodiments.

In embodiments, the communications port 111, 121 of the marking machine 10 can be part of the marking machine, or the communications port 111, 121 can also be directly connected to the marking machine 10. Further, an alternative, as shown in FIG. 9, is to use a network module 200 to which the communications port 111, 121 is connected. The network module 200 can then be plugged into a network 20 to which the marking machine 10 is connected. Such a network module 200 could then be used by more than one marking machine 10 on the network 20.

The preceding description of the invention is exemplary in nature as it pertains to particular embodiments disclosed and no limitation as to the scope of the claims is intended by the particular choices of embodiments disclosed. Other modifications of the present invention may occur to those skilled in the art subsequent to a review of the present application, and these modifications, including equivalents thereof, are intended to be included within the scope of the present invention.

The invention claimed is:

1. An interface comprising:
   an electronic device attached to a marking machine, the marketing machine includes a local user interface;
   an input device with which a user can enter data into the electronic device;
   a graphically rendered button on the electronic device that indicates to the marking machine that the data entry is coming from a source other than the local user interface, local user interface of the marking machine;
   an application that is activated by the graphically rendered button to monitor communication ports on the marking machine for receipt of the data,
   a transmission system allowing transmission of the data from the electronic device to the local user interface of the marking machine, the local interface allows the user to initiate transmission of the data to the marking machine; and
   an applet that includes a component resident on the marking machine that receives the data and inserts the data into an active field of the local user interface of the marking machine for possible immediate use.

2. The interface according to claim 1 wherein the transmission system uses a wireless networking communications port of the electronic device.

3. The interface of claim 2 further comprising a network module including a wireless communications port compatible with that of the electronic device, the network module conveying data received via the wireless communications ports to the marking machine via a network to which the marking machine and the network module are attached.

4. The interface of claim 1 wherein the transmission system uses a preexisting communications port of the marking machine.

5. The interface of claim 1 wherein the pre-existing communications port is a parallel port.

6. The interface of claim 1 wherein the transmission system comprises a hard wire connection between the electronic device and the marking machine.

7. The interface of claim 1 wherein the input device comprises a stylus.

8. The interface of claim 1, wherein the electronic device is a least one of a laptop computer, a cell phone, a wireless telephone, a personal data assistant (PDA) and a PDA/telephone hybrid.

9. The interface of claim 1, wherein the user can indicate data entry completion to initiate transmission of data entered into the electronic device to the marking machine.

10. A method of effectively extending a marking machine local UI comprising:
    providing an electronic device with a communications port and an input device;
    attaching the electronic device to a marking machine, the marking machine;
    entering data on the electronic device with the input device;
    indicating to the marking machine that the data entry is coming from a source other than the local user interface of the marking machine, via a graphically rendered button on the electronic device;
    activating an application by the graphically rendered button to begin monitoring communication ports on the marking machine for receipt of the data;
    prompting a user to initiate transmission of the data to the marking machine via a second graphically rendered button on the user interface of the marking machine;
    transmitting the data to the marketing machine via the communications port;
    inserting the transmitted data into an active area on the local UI of the marking machine for potentially immediate use; and
    using the transmitted data to perform a function of the marking device.

11. The method of claim 10 further comprising providing a software application on the marking machine, monitoring at least one communications port of the marking machine, and detecting incoming data from the electronic device.

12. The method of claim 10 further comprising equipping the marking machine with a wireless communications port.

13. The method of claim 12 wherein equipping includes directly connecting the wireless communications port to the marking machine.

14. The method of claim 12 wherein equipping includes installing the wireless communications port on a network module and connecting the network module to a network to which the marking machine is connected.

15. The method of claim 10 wherein providing an electronic device with a communications port and an input device includes providing a stylus interface.

16. The method of claim 10 further comprising providing a UI dialog into which an entry must be made and providing a UI element allowing a user to indicate that data for the entry will come from the communications port of the electronic device.

17. The method of claim 10 wherein entering data includes indicating when data is ready for transmission to the marking machine.

18. The method of claim 10 wherein entering data includes reading at least a portion of an entry in a database accessible by the electronic device.

19. The method of claim 18 wherein the database is an address book and reading at least a portion of an entry in a database includes reading an e-mail address from the address book.

20. The method of claim 18 wherein the database is stored on a memory that the user attaches to the electronic device.

21. The method of claim 18 wherein the database is accessed over a network.

22. An interface comprising:
- an electronic device attached to a marking machine; an element of a local user interface of the marking machine by which a user may instruct the marking machine to monitor data transmitted by an electronic device;
- an input device with which a user can enter data into the electronic device;
- a graphically rendered button on the electronic device that indicates to the marking machine that the data entry on the electronic device is coming from a source other than the local user interface of the marking machine;
- an application that is activated by the graphically rendered button to monitor communication ports on the marking machine for receipt of the data, and
- a transmission system allowing transmission of the data from the electronic device to the local user interface of the marking machine, wherein the interface is an applet that includes a component resident on the marking machine that receives the data and inserts the data into an active field of the local user interface of the marking machine for potentially immediate use;
- the interface further comprising:
    - providing the electronic device with a communications port and the input device;
    - attaching the electronic device to the marking machine;
    - entering the data on the electronic device with the input device; and
    - transmitting the data to the marking machine via the communications port; and
- an element coupled to the user interface that initiates at least, one of monitoring and transmission of the data to the marketing machine from the electronic device.

* * * * *